(12) United States Patent
Aguerre et al.

(10) Patent No.: US 8,905,450 B2
(45) Date of Patent: Dec. 9, 2014

(54) HANDLING EQUIPMENT FOR VIALS AND SYSTEM FOR THE PREPARATION OF MEDICATIONS COMPRISING IT

(71) Applicant: Kiro Robotics, S.L., Aretxabaleta (Gipuzkoa) (ES)

(72) Inventors: Jean-Philippe Aguerre, Itxassou (FR); Borja Lizari Illarramendi, Vitoria-Gasteiz (ES); Susana Soto Iglesias, Arrasate-Mondragon (ES); Naiara Telleria Garay, Arrasate-Mondragon (ES); Gorka Garcia Etxebarria, Aretxabaleta (ES)

(73) Assignee: Kiro Robotics, S.L., Aretxabaleta (EP)

( * ) Notice: Subject to any disclaimer, the term of this patent is extended or adjusted under 35 U.S.C. 154(b) by 0 days.

(21) Appl. No.: 13/931,125

(22) Filed: Jun. 28, 2013

(65) Prior Publication Data

US 2014/0167430 A1 Jun. 19, 2014

(30) Foreign Application Priority Data

Dec. 14, 2012 (ES) .................................. 201231946

(51) Int. Cl.
*B25J 15/00* (2006.01)
*B65B 3/00* (2006.01)

(52) U.S. Cl.
CPC ............. *B25J 15/0028* (2013.01); *B65B 3/003* (2013.01)
USPC ........................................... 294/90; 294/99.1

(58) Field of Classification Search
USPC ............. 294/29, 86.4, 90, 99.1; 269/104, 155
See application file for complete search history.

(56) References Cited

U.S. PATENT DOCUMENTS

| 2,829,918 | A | * | 4/1958 | Stoakes et al. | ................ 294/99.1 |
| 3,845,963 | A | * | 11/1974 | Price | .................................. 279/89 |
| 4,585,369 | A | * | 4/1986 | Manesse et al. | ............ 403/322.3 |
| 4,826,230 | A | * | 5/1989 | Truchet | .......................... 294/194 |
| 5,769,476 | A | * | 6/1998 | Lawn et al. | ................... 294/99.1 |
| 5,948,360 | A | | 9/1999 | Rao et al. | |
| 7,287,792 | B2 | * | 10/2007 | Tye | ............................. 294/103.1 |
| 2009/0163860 | A1 | | 6/2009 | Patrick et al. | |
| 2011/0266409 | A1 | | 11/2011 | Warrick et al. | |

FOREIGN PATENT DOCUMENTS

| EP | 1779830 A1 | 5/2007 |
| JP | 2010246713 A | 11/2010 |
| WO | WO 2009060905 A1 | 5/2009 |
| WO | WO 2009147252 A1 | 12/2009 |

OTHER PUBLICATIONS

Spanish search report dated Dec. 12, 2012 in corresponding Spanish Application No. 201231946 filed Dec. 14, 2012.

\* cited by examiner

*Primary Examiner* — Dean Kramer
(74) *Attorney, Agent, or Firm* — RatnerPrestia

(57) ABSTRACT

Equipment for the handling of vials which comprises: a base on which at least part of the vials being handled is located and transverse supporting member for the vials in which the transverse supporting member exerts a force in a substantially transverse plane to the necks of the vials, which comprise supplementary supporting member for the vials; these supplementary supporting member applying a second force in a plane that is substantially inclined with respect to the plane in which the transverse supporting member exerts the first force.

5 Claims, 6 Drawing Sheets

HANDLING EQUIPMENT FOR VIALS AND SYSTEM FOR THE PREPARATION OF MEDICATIONS COMPRISING IT

This invention relates to equipment preferably for connection to robotic arms which is in particular advantageous for the handling of vials of different sizes.

In particular, this invention relates to equipment for the handling of vials which can handle vials of different sizes without the need for any procedure for adjusting the equipment.

The use of this type of equipment is particularly advantageous in automated systems for processing of medications comprising robotic arms. In the prior art some of the automated devices for the processing of medications require complex systems to detect the size of vials and complicated software routines to ensure that no force is applied to the vials which might damage them. In fact some manufacturers of systems of this type of systems incorporate different robotic arms depending upon the size of vial which has to be handled.

Vials are containers comprising a body, a neck and a cap, the cap particularly comprising an elastomer material through which substances are extracted or injected.

For example, one type of conventional vial used in medical applications comprises a metal head with a hole in its intermediate area in which the elastomer material is located. Furthermore, beneath this head vials comprise a neck of smaller diameter than the head and a vial body with a diameter greater than that of the neck. Generally the vials are of glass.

There are various items of equipment in the prior art for handling vials by means of robotic arms, and among this equipment, mention should be made of that disclosed by patent US2008/199353. This equipment comprises metal tongs comprising motorised means to support the vials by their bodies.

This embodiment of equipment has the problem that it is necessary to prepare a complex program for the equipment and/or include additional instrumentation to detect the size of each of the vials before the tongs support them. Even if all necessary precautions are taken, it is very likely that vials will break when being handled by tongs that support them by their bodies. Furthermore when vials are supported by their bodies the tongs may cover the bar codes identifying the products, preventing the bar codes from being read while the vials are supported by that equipment.

In addition to this, patent document US2010/268167 discloses equipment for the handling of vials comprising an adapter located in the head and neck of the vials, ensuring that the neck portion of the vials has a single size, which is subsequently supported through a base equipped with resilient means for opening and closure.

This device has the disadvantage that it requires more work to prepare the vials before use, because it is first necessary to have the adapter so that the base can subsequently be located on that adapter. Furthermore, as this adapter locates on the heads and necks of vials, it prevents conventional syringes from being used to inject or extract liquid from the vials, which makes them difficult to use in an automated environment.

Additionally solutions of this nature to support vials by the neck gives rise, as is known, to a pitching movement, that is to say that when a vial is supported by the neck this does not ensure that the vial is located in a perpendicular position with respect to the equipment. Thus, when the equipment has to rotate for the label on the vial to be read by automated means (such as, for example, a video camera) in addition to rotation there is a translational movement of the body of the vials which distorts the image read by the system, which may give rise to reading errors. As a consequence systems in the prior art have to have complex image processing systems to correct these distortions, and these reduce their speed and require greater computational cost.

In conclusion it is desirable that involuntary inclination or translational movements of vials be avoided when the robotic arm rotates. In this description these involuntary movements are referred to as tilting movements.

In order to overcome the problems presented by devices according to the prior art this invention discloses equipment for the handling of vials preferably by means of a robotic arm which does not obstruct the heads of the vials or at least the parts of the head where there is a resilient member for introduction of a syringe. Furthermore the device disclosed by this invention prevents tilting movement of the vials when for example the robotic arm causes these to rotate about their longitudinal axes.

Specifically, this invention discloses equipment for the handling of vials comprising:
 a base on which at least part of the vials being manipulated are located; and
 means for transversely supporting the vials;
in which the transverse supporting means apply a first force to the necks of the vials in a substantially transverse plane. In addition to this the equipment comprises:
 supplementary supporting means for the vials;
these supplementary supporting means applying a second force in a plane that is substantially inclined with respect to the plane in which the transverse supporting means apply a force.

The inclined force applied by the supplementary supporting means is preferably in a plane inclined at 45° and 135° with respect to the plane corresponding to the force applied by the transverse supporting means. This supplementary force increases the support for the vials, avoiding the movements known as "tilting movements" which occur when the vials have to be rotated, for example in order that their labels may be read. Ideally the force applied to the vials by these means is located in a plane inclined at approximately 90° with respect to the plane corresponding to the force applied by the transverse supporting means, so that there is a force with a substantially transverse component and a force with a substantially longitudinal component.

Preferably the supporting force applied by the supplementary supporting means is substantially applied to the heads of the vials so that there are no components on the bodies of the vials which might for example prevent labels from being read.

In a particular embodiment of this invention the transverse supporting means and/or the supplementary supporting means comprise at least one resilient member.

In order that the contents of vials can be removed by means of conventional syringes of the type having needles which perforate parts of the vials in order to extract liquids from them, the equipment comprises an opening in its central portion which allows access to at least part of the heads of the vials.

More particularly the equipment according to this invention comprises an extraction member which presses upon the transverse supporting means and causes them to cease to apply force to the vials in such a way that the vials can be removed from the equipment.

In addition to this, this invention discloses a system for preparing medications in which there is provided a robotic arm and equipment having the characteristics mentioned above.

For a better understanding, drawings of an embodiment of the equipment to which this invention relates are appended by way of an explanatory but not limiting example.

FIG. 1 illustrates a transverse cross-section through equipment for vials. In this cross-section it will be seen that the equipment supports vials -100- through a supporting member -10- which can move with respect to the base -13- of the equipment.

In this particular embodiment, supporting member -10- can move due to the forces exerted by resilient means comprising a first spring -11- and a second spring -12-. It is important to point out that the scope of this invention also includes that these forces may be applied by other means which are not resilient such as for example servomotors.

In this embodiment there is a simple system to support and release vials from the device, member -10- has an opening -15- of substantially elliptical shape through which at least part of vials -100- are located. To support a vial a force is applied to member -10- in a direction towards its geometrical centre, vial -100- passes through opening -15- and force ceases to be applied to member -10-. As force ceases to be applied on member -10- first spring -11- and second spring -12- apply a force in a contrary direction which displaces opening -15- in member -10- towards a top -14- in such a way that it applies a transverse supporting force to the vial.

This support is a safe support and prevents the occurrence of incidents through lack of support for the vials. Furthermore, no modification whatsoever is required to the heads of the vials, which means that they can then be used by conventional injection and extraction means such as syringes.

Supplementary supporting means which, together with the transverse supporting means previously described ensure that vials are not only supported but also aligned will be described below.

Figure 2:
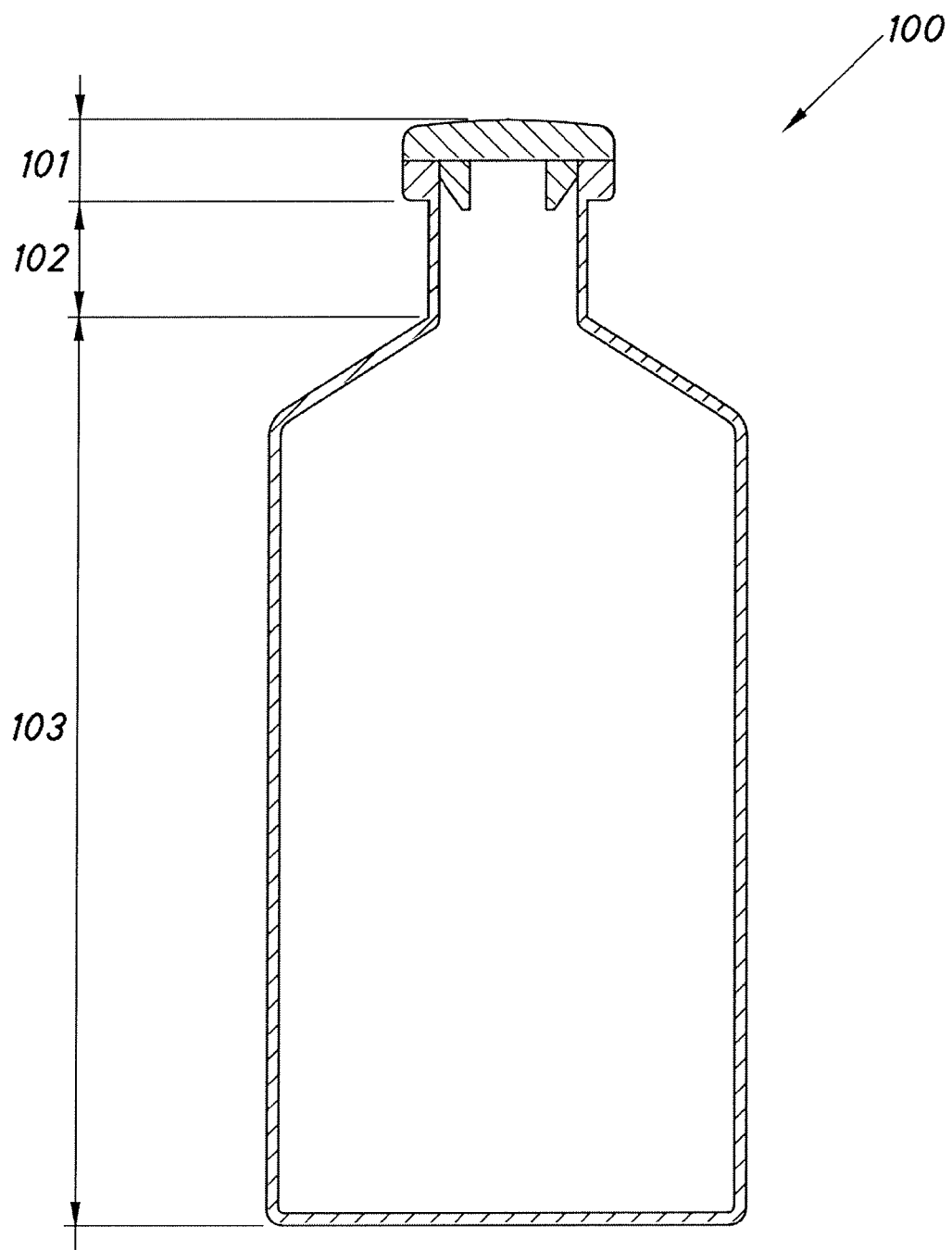
FIG. 2 shows a longitudinal cross-section through a vial.

FIG. 2 illustrates an embodiment of a vial which can be used in equipment according to this invention.

The vial in FIG. 2 has a cap -101-, a neck -102- and a body -103-. In addition to this conventional vials have an identification label on their bodies -103- which normally comprises a bar code. As a consequence the equipment according to this invention has a considerable advantage in that it supports vials by their necks -102-, in that components external to the equipment such as for example robotic arms support the vials without interfering with the labels, so that they can be read.

Figure 1:
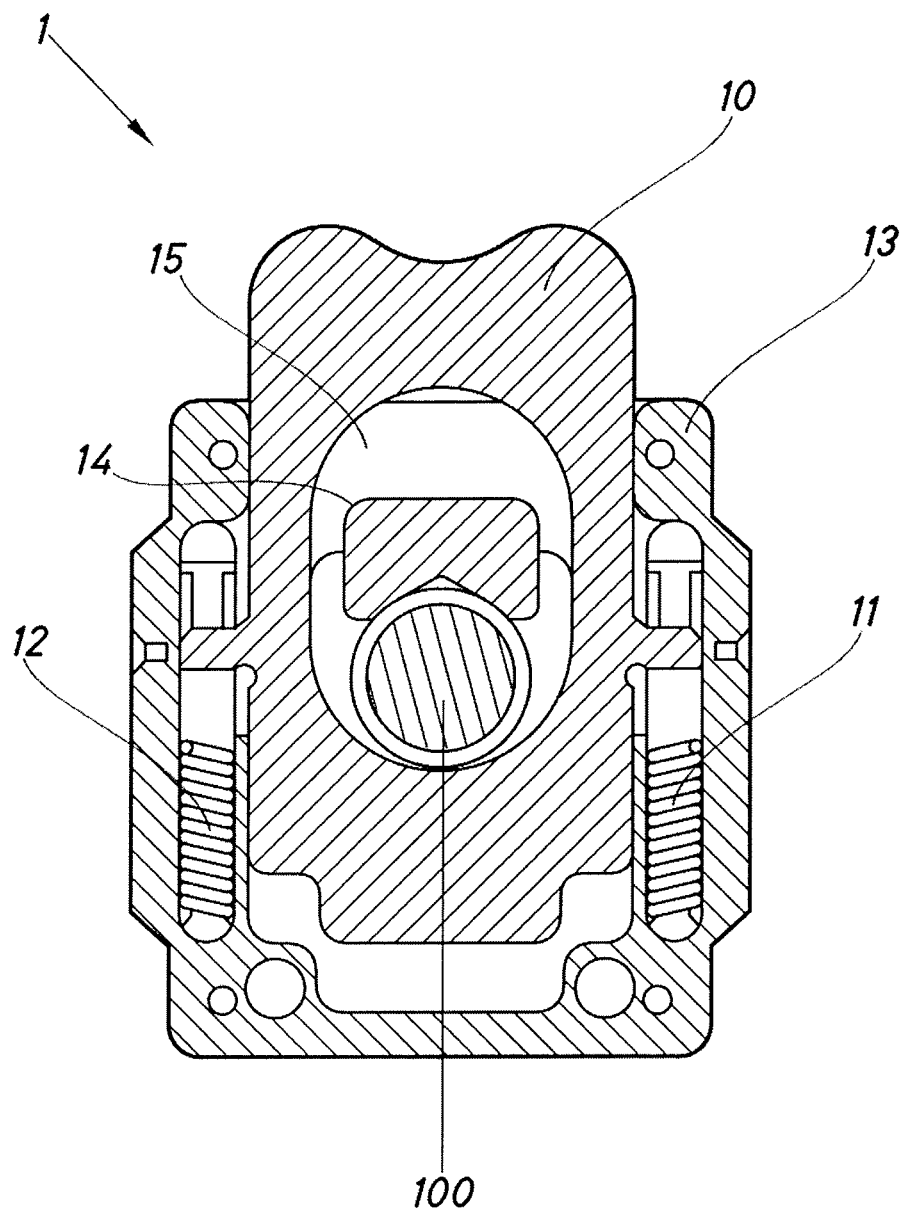
FIG. 1 shows a transverse cross-section through equipment for vials belonging to the state of the art in which transverse supporting means are illustrated.
Figure 3:
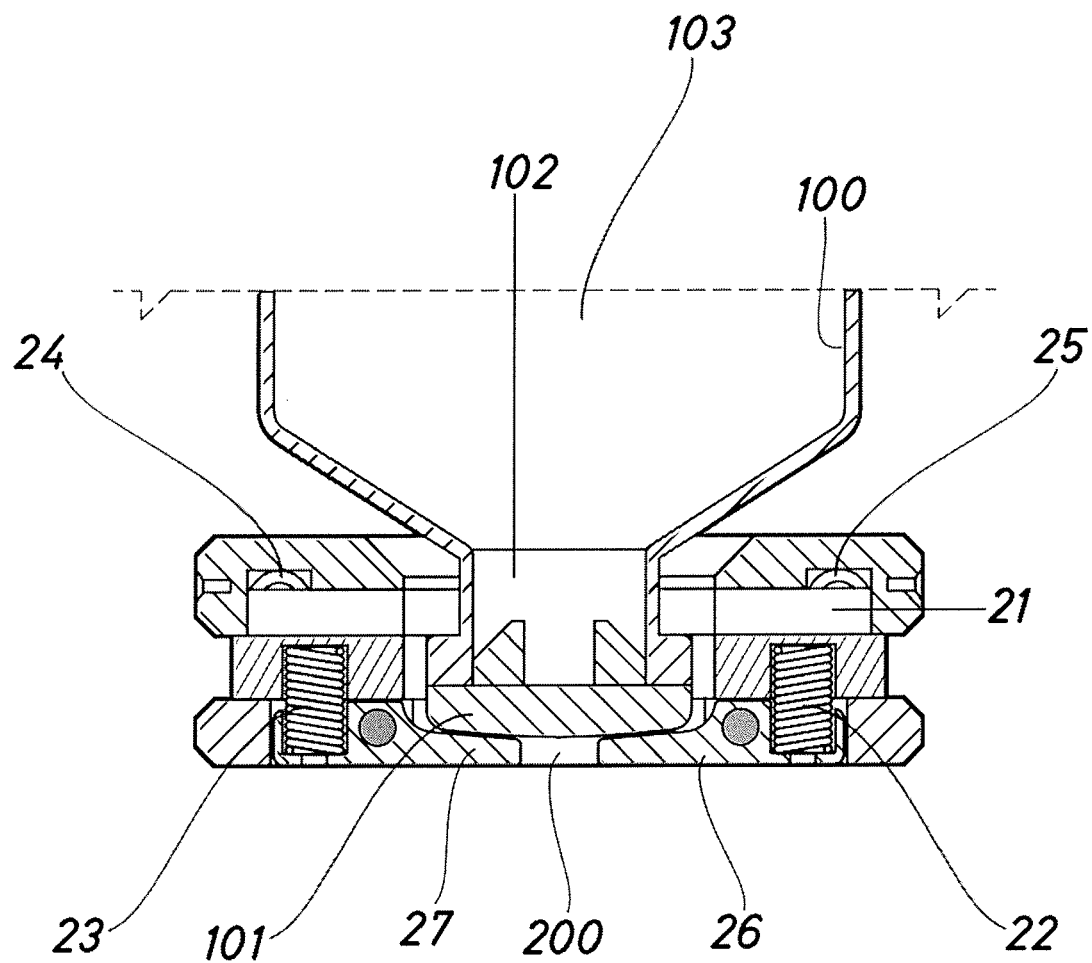
FIG. 3 shows a longitudinal cross-section through equipment for vials according to this invention supporting a first vial.
Figure 4:
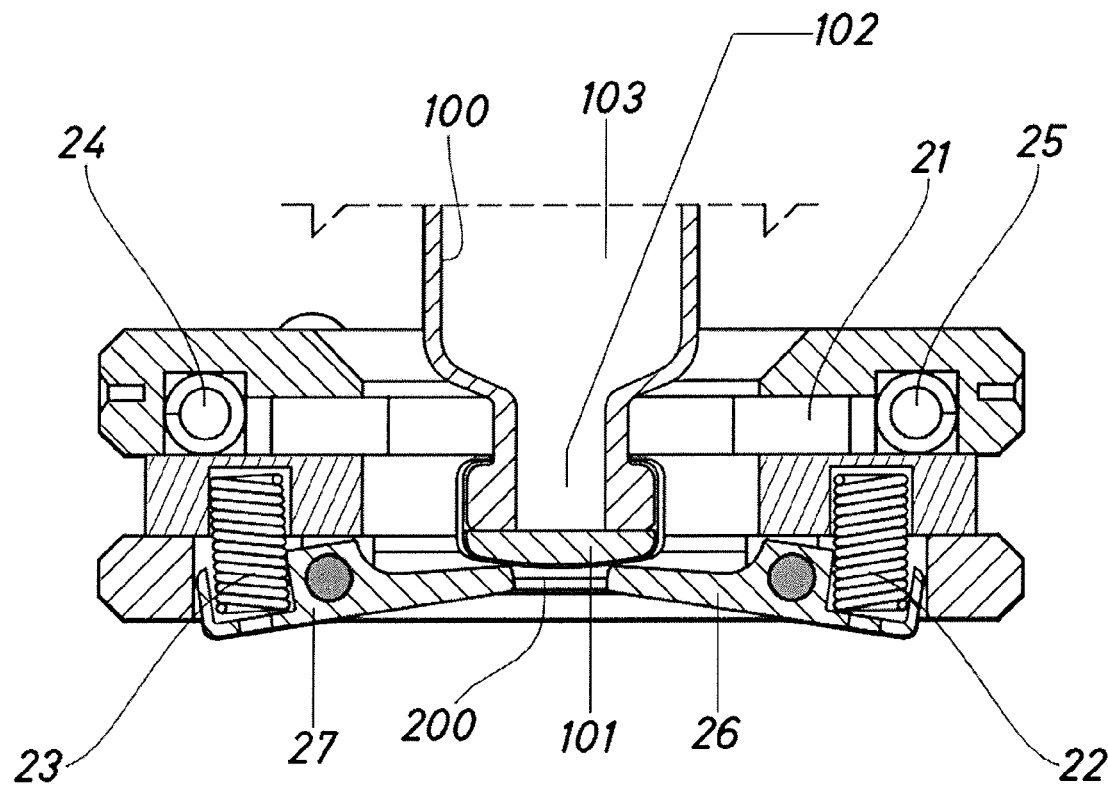
FIG. 4 shows a longitudinal cross-section through the equipment for vials in FIG. 3 supporting a second vial.

FIGS. 3 and 4 illustrate equipment according to this invention. In this equipment, in addition to the transverse supporting means described in FIG. 1, supplementary supporting means are incorporated which provide a force in a direction different from the transverse direction in such a way that the vials are supported in a position which is substantially perpendicular to the equipment.

In this embodiment, in addition to having a transverse supporting member incorporating a first spring -24- and a second spring -25- which exerts a transverse force on the neck -102- of vial -100-, the equipment comprises a supplementary supporting member which has a first pivoting arm -26- and a second pivoting arm -27-.

In this particular embodiment the pivoting arms -26-, -27- are subjected to a force exerted by springs -22-, -23- respectively at one of their ends. In this way pivoting arms -26-, -27- apply a force via their other extremities in a plane substantially perpendicular to the plane in which the transverse supporting means apply force, that is to say they apply a force in the substantially longitudinal direction of the vials.

This substantially longitudinal force applied by the second extremity of pivoting arms on the cap of a vial -101- fulfils the function of lining up the vial, that is to say holding vial -100- in a position substantially perpendicular to the equipment. This alignment is achieved because the cap of the vial has projections from neck -102- which, when a substantially longitudinal force is applied to the cap, abut against a part -21- of the equipment.

In addition to this, the equipment to which this invention relates has a groove -200- which coincides with a cross-section of the vial cap. This groove is of considerable importance in the device because it is designed to prevent the need for additional means to be able to extract or inject liquid from/into vials -100-. Through the arrangement of groove -200- it is possible to use conventional syringes, which simplifies use of the vials in systems comprising automated components such as robotic arms or the like. Also this arrangement makes it possible for the equipment to be used for manual operations without having to remove and/or modify components of the system.

FIG. 3 illustrates the operation of this invention on a vial of larger size than is the case in FIG. 4. These figures illustrate how the supplementary supporting means apply a similar force regardless of vial size, ensuring that the means keep the vials in alignment and supported regardless of their size.

Figure 5:
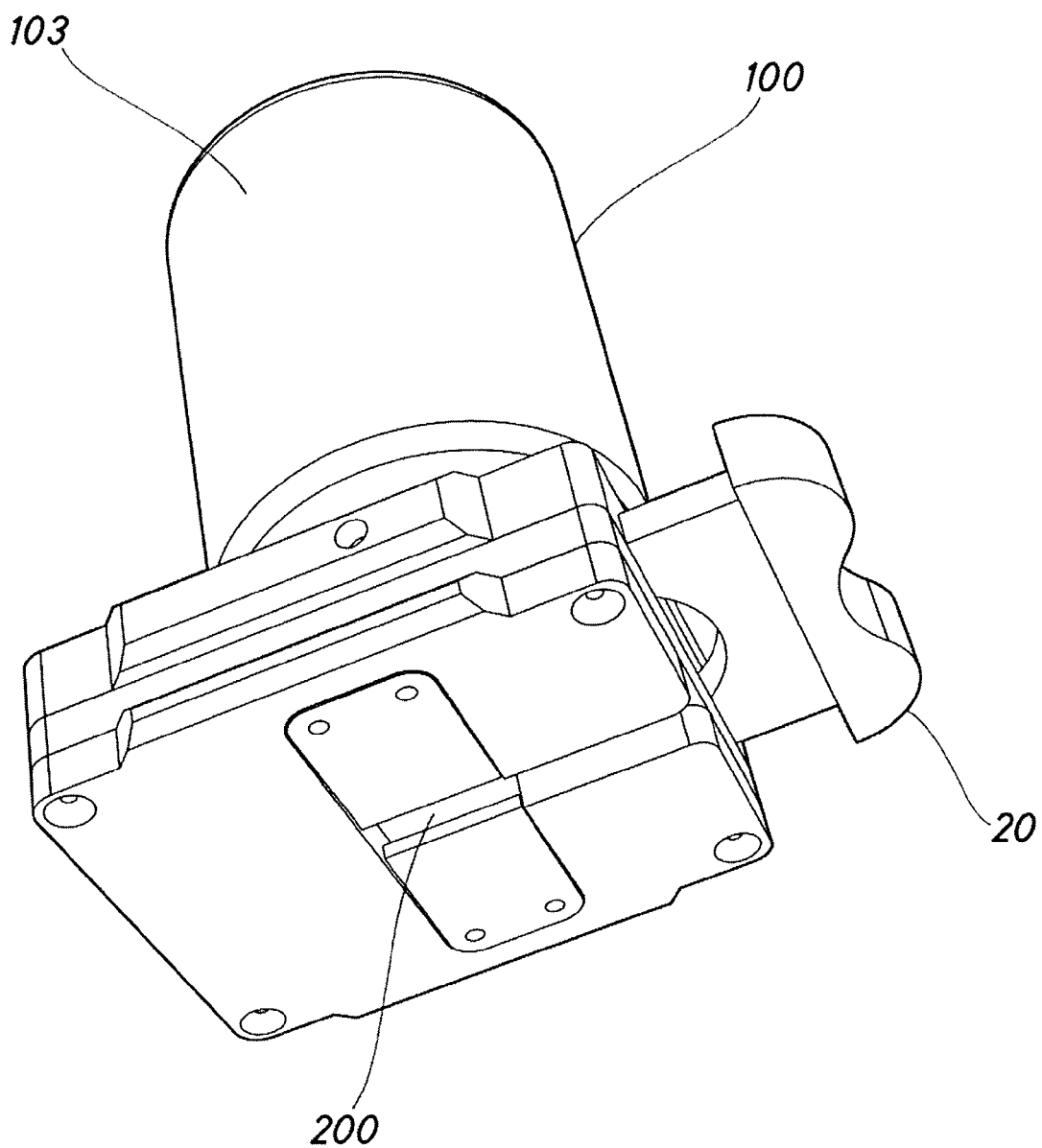
FIG. 5 shows a perspective view of an embodiment of equipment according to this invention supporting a vial.

FIG. 5 is a perspective view of an embodiment of the equipment according to this invention. In this figure it can be seen how the transverse supporting means comprise an actuator -20- which is pressed to release vial -100-. Also, in this figure groove -200- described above can be seen in greater detail and this specifically is a groove intended to allow components such as syringe needles to pass in order to inject and/or extract vial contents. In addition to allowing the vials to be pierced it allows an extensive area of the rubber injection point on the vial to be seen, thus allowing various checks or actions, for example checking whether the plastic cap has been removed from a vial.

Figure 6:
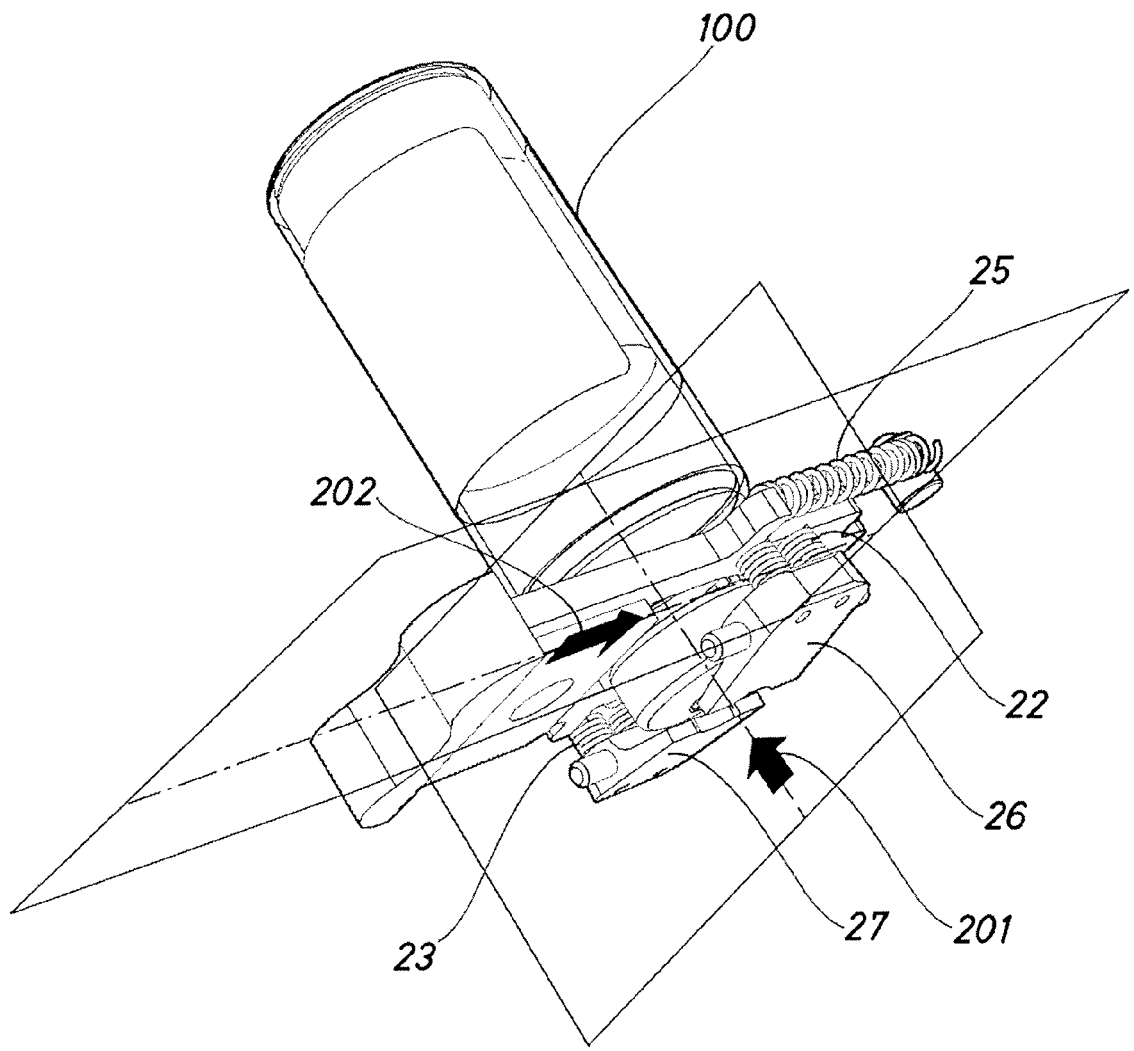
FIG. 6 shows a perspective view of the device in FIG. 5 in which its body has been removed and the forces acting on vials are illustrated.

FIG. 6 shows a perspective view of FIG. 5 without the body so that the internal components of the equipment may be seen.

In this figure the transverse plane in which transverse force -202- applied by springs -25- located in a substantially transverse plane can be seen in greater detail.

In addition to this a longitudinal force -201- acts on vials in a plane substantially inclined to the transverse plane. Specifically the aim is that by means of supplementary supporting means a force -201- which has a component in the longitudinal plane of the vials should be applied. In the embodiment in FIG. 6 there will be seen the preferred embodiment in which the transverse force -202- and the longitudinal force -201- are perpendicular to each other.

Although the invention has been described in relation to preferred embodiments, these should not be regarded as restricting the invention, which will be defined by the broadest interpretation of the following claims.

The invention claimed is:

1. An equipment for handling a vial, comprising:
a base on which at least part of the vial being handled is located;
a transverse supporting member comprising a first spring and a second spring, such that the transverse supporting member exerts a first force in a substantially transverse plane to the neck of the vial;
a supplementary supporting member comprising a first pivoting arm and a second pivoting arm, such that the supplementary supporting member exerts a second force in a plane substantially inclined with respect to the plane in which the transverse supporting member exerts the first force, wherein the supplementary supporting member comprises an extraction member which, on being pressed, allows the supporting member to release the vial; and
a groove that coincides with a cross-section of cap of the vial, such that the groove allows for extracting liquid from, or injecting liquid into, the vial.

2. The equipment according to claim 1, wherein the supplementary supporting member exerts the force in a plane inclined at between 45° and 135° with respect to the plane corresponding to the force exerted by the transverse supporting member.

3. The equipment according to claim 2, wherein the supplementary supporting member exerts the force in a plane inclined at approximately 90° with respect to the plane corresponding to the force applied by the transverse supporting member.

4. The equipment according to claim 2, wherein the force exerted by the supplementary supporting member is exerted substantially to the head of the vials.

5. The equipment according to claim 2, wherein the supplementary supporting member comprises a resilient member.

* * * * *